United States Patent [19]
Collina et al.

[11] Patent Number: 6,028,140
[45] Date of Patent: Feb. 22, 2000

[54] PROCESS FOR THE (CO)POLYMERIZATION OF OLEFINS

[75] Inventors: Gianni Collina, Casalecchio di Reno; Tiziano Dall'occo, Ferrara; Maurizio Galimberti, Milan; Enrico Albizzati, Arona; Luciano Noristi, Ferrara, all of Italy

[73] Assignee: Montell Technology Company B.V., Netherlands

[21] Appl. No.: 08/865,079

[22] Filed: May 29, 1997

Related U.S. Application Data

[62] Division of application No. 08/461,691, Jun. 5, 1995, Pat. No. 5,648,422.

[30] Foreign Application Priority Data

Oct. 5, 1994 [IT] Italy .................................. MI94A2028

[51] Int. Cl.⁷ .................................................. C08G 63/48
[52] U.S. Cl. .......................... 525/53; 525/245; 525/246; 525/247; 525/249; 525/319; 525/322; 526/201; 526/348
[58] Field of Search ............................ 525/53, 240, 243, 525/247, 245, 249, 319, 322, 246; 526/119, 114, 348, 201

[56] References Cited

U.S. PATENT DOCUMENTS

| | | | |
|---|---|---|---|
| 4,298,718 | 11/1981 | Mayr et al. | 526/125 |
| 4,431,571 | 2/1984 | Karayannis | 502/151 |
| 4,495,338 | 1/1985 | Mayr et al. | 526/125 |
| 4,521,566 | 6/1985 | Galli et al. | 525/247 |
| 4,734,459 | 3/1988 | Cecchin et al. | 525/247 |
| 4,894,421 | 1/1990 | Kioka et al. | 525/243 |
| 5,132,262 | 7/1992 | Rieger et al. | 502/117 |
| 5,212,132 | 5/1993 | Spitz et al. | 502/134 |
| 5,242,876 | 9/1993 | Shamshoum et al. | 502/113 |
| 5,346,925 | 9/1994 | Sugano et al. | 521/54 |
| 5,397,843 | 3/1995 | Lakshmanan et al. | 525/240 |
| 5,468,807 | 11/1995 | Tsurutani et al. | 525/240 |
| 5,844,045 | 12/1998 | Kolthammer et al. | 525/240 |

FOREIGN PATENT DOCUMENTS

| | | |
|---|---|---|
| 0 174 863 A2 | 3/1986 | European Pat. Off. . |
| 0 361 493 A1 | 4/1990 | European Pat. Off. . |
| 0 361 494 A2 | 4/1990 | European Pat. Off. . |
| 0 362 705 A2 | 4/1990 | European Pat. Off. . |
| 0 395 083 A2 | 10/1990 | European Pat. Off. . |
| 0 433 989 A2 | 6/1991 | European Pat. Off. . |
| 0 433 990 A2 | 6/1991 | European Pat. Off. . |
| 0 451 645 A2 | 10/1991 | European Pat. Off. . |
| 0 485 820 A2 | 5/1992 | European Pat. Off. . |
| 0 485 822 A2 | 5/1992 | European Pat. Off. . |
| 41 30 429 A1 | 3/1993 | European Pat. Off. . |
| 0 549 900 A1 | 7/1993 | European Pat. Off. . |
| 0 553 805 A1 | 8/1993 | European Pat. Off. . |
| 0 553 806 A1 | 8/1993 | European Pat. Off. . |
| 0 558 987 A2 | 9/1993 | European Pat. Off. . |
| WO 93/19107 | 9/1993 | European Pat. Off. . |
| 0 604 917 A2 | 7/1994 | European Pat. Off. . |
| 0 624 604 A1 | 11/1994 | European Pat. Off. . |
| 0 632 065 A1 | 1/1995 | European Pat. Off. . |
| 0 632 066 A1 | 1/1995 | European Pat. Off. . |
| 0 643 078 A2 | 3/1995 | European Pat. Off. . |
| 0 643 079 A2 | 3/1995 | European Pat. Off. . |
| WO 94/17112 | 8/1994 | WIPO . |

*Primary Examiner*—David W. Wu
*Assistant Examiner*—Roberto Rabago
*Attorney, Agent, or Firm*—Bryan Cave LLP

[57] ABSTRACT

Homopolymers or copolymers obtained by a multistage process of olefins having the formula $CH_2$=CHR, in which R is hydrogen or R has from 1 to 10 carbon atoms and is an alkyl, cycloalkyl or aryl group, the process comprising:

(A) a first stage of polymerization in which one or more of the olefins are polymerized in the presence of a titanium or vanadium catalyst;

(B) a treatment stage in which the product obtained in the first stage of polymerization (A) is brought into contact with a compound capable of deactivating the catalyst present in the stage (A); and also brought into contact with a compound of a transition metal M selected from the group consisting of Ti, Zr, V, or Hf containing at least one M-π bond and optionally with an alkyl-Al compound; and (C) a second stage of polymerization in which one or more of the olefins are polymerized, in one or more reactors, in the presence of the product obtained in treatment stage (B).

3 Claims, No Drawings

PROCESS FOR THE (CO)POLYMERIZATION OF OLEFINS

This is a divisional of U.S. application Ser. No. 08/461, 691, filed Jun. 5, 1995 now U.S. Pat. No. 5,648,422.

The present invention relates to a process with several stages for the polymerization of olefins $CH_2=CHR$, where R is hydrogen or an alkyl, cycloalkyl or aryl radical with 1–10 carbon atoms, carried out in two or more reactors. In at least one reactor, one or more of the said olefins are polymerized in the presence of a catalyst comprising the product of the reaction of an alkyl-Al compound with a compound of Ti and/or V supported on a magnesium halide in active form, obtaining an olefin polymer. In at least one other reactor, upon deactivation of the catalytic system operating in the first reactor, one or more of the said olefins $CH_2=CHR$ are polymerized in the presence of the product obtained by bringing the said olefin polymer into contact with a compound of a transition metal M containing at least one M-π bond, obtaining new polymer compositions directly from the reactors.

Multistage processes for the polymerization of olefins, carried out in two or more reactors, are known from the patent literature and are of particular interest in industrial practice. The possibility of independently varying, in any reactors, process parameters such as temperature, pressure, type and concentration of monomers, concentration of hydrogen or other molecular weight regulator, provides much greater flexibility in controlling the composition and properties of the end product with single-stage processes.

Multistage processes are generally carried out using the same catalyst in the various stages/reactors: the product obtained in one reactor is discharged and sent directly to the next stage/reactor without altering the nature of the catalyst.

Processes in several stages find application for example in the preparation of olefin (co)polymers with broad molecular weight distribution (MWD), by producing polymer species with different molecular weight in the various reactors. The molecular weight in each reactor, and therefore the range of the MWD of the final product, is generally controlled by using different concentrations of a molecular weight regulator, which is preferably hydrogen. Multistage processes are also used in the preparation of high-impact propylene copolymers by sequential polymerization of propylene and mixtures of propylene with ethylene. In a first stage, propylene is homopolymerized or copolymerized with smaller proportions of ethylene and/or olefins having 4–10 carbon atoms, obtaining a stereoregular polymer; in a second stage, mixtures of ethylene and propylene are polymerized in the presence of the polymer including the catalyst that is obtained in the first stage, obtaining polypropylene compositions having improved impact strength.

Processes of this type are described, for example, in U.S. Pat. No. 4,521,566. In said patent, polypropylene compositions having high impact strength are prepared in a multi-stage process which comprises at least one stage of homopolymerization of propylene and at least one stage of polymerization of ethylene/propylene mixtures in the presence, in both stages, of a catalyst comprising a compound of titanium supported on a magnesium halide in active form.

European Patent Application EP-A-433989 describes a process for preparing polypropylene composition containing from 20 to 99% by weight of a crystalline (co)polymer, containing at least 95% by weight of propylene units, and from 1 to 80% by weight of a noncrystalline ethylene/propylene copolymer, containing from 20 to 90% by weight of ethylene units. The process is carried out in 2 stages: in a first stage, carried out in liquid propylene, the crystalline propylene (co)polymer is produced, and in a second stage, carried out in hydrocarbon solvent, the non-crystalline ethylene/propylene copolymer is produced. The same catalyst, consisting of a chiral metallocene and an aluminoxane, is used in both stages.

European Patent Application EP-A-433990 describes a process in two stages for the preparation of propylene-based polymer composition similar to those described in EP-A-433989, in which the crystalline propylene (co)polymer is produced in the first stage by polymerization in liquid propylene, and the noncrystalline ethylene/propylene copolymer is produced in the second stage by gas-phase polymerization. Also in this case, the same catalyst, consisting of a chiral metallocene and an aluminoxane is used in both reactors.

German Patent Application DE 4130429 describes a multi-stage process for the production of block copolymers, effected entirely in the gas phase. In a first stage there is production of a matrix consisting of a homo or copolymer of propylene in a quantity of between 45 and 95% by weight based on the total product; in a second stage, carried out in the presence of the polypropylene matrix previously produced and of the catalyst used therein, an ethylene/α-olefin copolymer is prepared, containing from 0.1 to 79.9% by weight of ethylene units, in a quantity of between 5 and 55% by weight based on the total product. In both stages, polymerization is carried out in the gas phase using the same metallocene catalyst.

The processes of the state of the art have various limitations, one of which derives from the fact that the same catalyst is used in the different process stages and therefore the characteristics of the products obtained in the individual stages are not always optimum. For example, in the case of heterophase copolymers prepared in multistage processes using titanium catalysts, the properties of the rubbery copolymer produced in the second stage are poor. In fact, it is known that titanium catalysts produce ethylene/propylene copolymers containing relatively long sequences of the same monomer unit and consequently the elastomeric properties of the product are poor.

It has now been found a multistage process by which it is possible to produce a wide range of olefin polymer compositions, working with different catalytic systems in the various stages. In particular, the process of the invention comprises a first stage in which, in the presence of titanium catalysts or vanadium catalysts, an olefinic polymer is prepared, and a second stage in which the catalyst used in the first stage is deactivated, and a third stage in which, in the presence of the said olefin polymer and of a compound of a transition metal M selected from Ti, Zr, V, or Hf containing at least one M-π bond and/or of their reaction products, one or more olefins are polymerized, said olefins being equal to or different from those polymerized in the first stage.

The process of the invention is characterized in that it comprises:

(A) a first stage of polymerization in which one or more of said olefins $CH_2=CHR$ are polymerized, in one or more reactors, in the presence of a catalyst comprising the product of reaction between an alkyl-Al compound and a solid component comprising a compound of a transition metal $M'$ selected from Ti and V, not containing M-π bonds, a halide of Mg in active form, to produce an olefin homo or copolymer;

(B) a treatment stage in which the product obtained in the first stage of polymerization (A) is, in any order whatever:

(a) contacted with a compound capable of deactivating the catalyst present in the said stage (A); and
(b) contacted with a compound of a transition metal M selected from Ti, Zr, V, or Hf containing at least one M-π bond and optionally with an alkyl-Al compound;

(C) a second stage of polymerization in which one or more of said olefins are polymerized, in one or more reactors, in the presence of the product obtained in said treatment stage (B).

In one of the preferred embodiment, the olefin homo- or copolymer produced in the first stage of polymerization (A) has porosity, expressed as percentage of voids, greater than 5%, preferably greater than 10%, more preferably greater than 15%.

Preferably, the polymers produced in the first stage of polymerization (A) are characterized by the fact that they have macroporosity. In general, more than 40% of the porosity of the said polymers is due to pores with diameter greater than 10000 Å.

The porosity, expressed as percentage of voids, and the distribution of pore radius are determined by the mercury method described hereinafter.

When a rubbery copolymer is produced in stage (C), the porosity of the polymer produced in the first stage of polymerization (A) makes it possible to work in the gas phase without particular problems.

The amount of polymer produced in the first stage of polymerization (A) is generally greater than 1000 g/g of solid component, preferably greater than 2000 g/g, more preferably greater than 3000 g/g.

The amount of polymer produced in polymerization stage (A) is preferably between 10 and 90% by weight relative to the total amount of polymer produced in stages (A) and (C) and more preferably is between 20 and 80%.

The catalyst used in the first stage of polymerization (A) comprises the product of the reaction between:

(i) a solid component comprising a compound of a transition metal $M^I$ selected from Ti and V and not containing $M^I$-π bonds, supported on a magnesium halide in active form. The solid component can also comprise an electron-donor compound (internal donor). As a rule the internal donor is used when the solid component is used for preparing catalysts for the stereospecific polymerization of propylene, 1-butene and similar α-olefins, where a high stereospecificity is necessary to obtain polymers with an isotactic index higher than 90;

(ii) an alkyl-Al compound and optionally an electron-donor compound (external donor).

When stereoregular polymers are produced in the first stage of polymerization (I), for example polymers of propylene with high isotacticity index, the external donor is used for imparting the necessary stereospecificity to the catalyst. However, when diethers of the type described in Patent EP-A-361493 are used as internal donors, the stereospecificity of the catalyst is sufficiently high in itself and the external donor is not necessary.

The halides of magnesium, preferably $MgCl_2$, in active form used as support for Ziegler-Natta catalysts, are widely known from the patent literature. Patents U.S. Pat. No. 4,298,718 and U.S. Pat. No. 4,495,338 first described the use of these compounds in Ziegler-Natta catalysis. It is known from these patents that the halides of magnesium in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is shifted towards lower angles compared with that of the most intense line.

The compound of the transition metal $M^I$ is selected preferably from the group consisting of: halides of titanium, halogen-alcoholates of titanium, $VCl_3$, $VCl_4$, $VOCl_3$, halogen-alcoholates of vanadium.

Among the titanium compounds, the preferred are $TiCl_4$, $TiCl_3$ and the halogen-alcoholates of formula $Ti(OR^I)_m X_n$ in which $R^I$ is a hydrocarbon radical with 1–12 carbon atoms or a $—COR^I$ group, X is a halogen and (m+n) is the valence of titanium.

The catalytic component (i) is advantageously used in the form of spherical particles with mean diameter between about 10 and 150 μm. Suitable methods for the preparation of said components in spherical form are described for example in Patents EP-A-395083, EP-A-553805, EP-A-553806, whose description relating to the method of preparation and to the characteristics of the products is herein incorporated for reference.

Examples of internal donor compounds are ethers, esters, in particular esters of polycarboxylic acids, amines, ketones and 1,3-diethers of the type described in Patents EP-A-361493, EP-A-361494, EP-A-362705 and EP-A-451645.

The alkyl-Al compound (ii) is generally selected from the trialkyl aluminium compounds such as for example triethyl-Al, triisobutyl-Al, tri-n-butyl-Al, tri-n-hexyl-Al, tri-n-octyl-Al. It is also possible to use mixtures of trialkyl-Al's with alkyl-Al halides, alkyl-Al hydrides or alkyl-Al sesquichlorides such as $AlEt_2Cl$ and $Al_2Et_3Cl_3$.

The external donor can be the same as or can be different from the internal donor. When the internal donor is an ester of a polycarboxylic acid, such as a phthalate, the external donor is preferably selected from silicon compounds of formula $R_1R_2Si(OR)_2$, where $R_1$ and $R_2$ are alkyl, cycloalkyl or aryl radicals with 1–18 carbon atoms. Examples of such silanes are methylcyclohexyldimethoxysilane, diphenyldimethoxysilane, methyl-t-butyldimethoxysilane, dicyclopentyldimethoxysilane.

The compounds of the transition metal M used in treatment stage (b) are selected from the compounds of Ti, V, Zr and Hf containing at least one M-π bond. Preferably, said compounds contain at least one ligand L, having a mono- or polycyclic structure containing conjugated π electrons, coordinated on the metal M.

Said compound of Ti, V, Zr or Hf is preferably selected from components having the following structure:

 (I)

 (II)

 (III)

in which M is Ti, V, Zr or Hf; $Cp^I$ and $Cp^{II}$, equal or different, are cyclopentadienyl groups, or substituted cyclopentadienyl groups; two or more substituents on said cyclopentadienyl groups can form one or more rings having from 4 to 6 carbon atoms; $R^1$, $R^2$ and $R^3$, equal or different, are atoms of hydrogen, halogen, an alkyl or alkoxy group with 1–20 carbon atoms, aryl, alkylaryl or arylalkyl with 6–20 carbon atoms, an acyloxy group with 1–20 carbon atoms, an allyl group, a substituent containing a silicon atom; A is an alkenyl bridge or one with structure selected from:

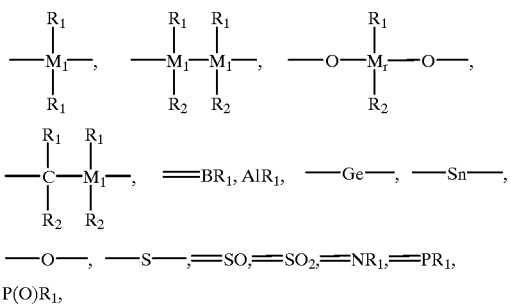

in which $M_1$ is Si, Ge, or Sn; $R_1$ and $R_2$, equal or different, are alkyl groups with 1–4 carbon atoms or aryl groups with 6–10 carbon atoms; a, b, c are, independently, integers from 0 to 4; e is an integer from 1 to 6 and two or more of the radicals $R^1$, $R^2$ and $R^3$ can form a ring. In the case when the Cp group is substituted, the substituent is preferably an alkyl group with 1–20 carbon atoms.

Representative compounds having formula (I) comprise: $(Me_5Cp)MMe_3$, $(Me_5Cp)M(OMe)_3$, $(Me_5Cp)MCl_3$, $(Cp)MCl_3$, $(Cp)MMe_3$, $(MeCp)MMe_3$, $(Me_3Cp)MMe_3$, $(Me_4Cp)MCl_3$, $(Ind)MBenz_3$, $(H_4Ind)MBenz_3$, $(Cp)MBu_3$.

Representative compounds having formula (II) comprise: $(Cp)_2MMe_2$, $(Cp)_2MPh_2$, $(Cp)_2MEt_2$, $(Cp)_2MCl_2$, $(Cp)_2M(OMe)_2$, $(Cp)_2M(OMe)Cl$, $(MeCp)_2M\,Cl_2$, $(Me_5Cp)_2MCl_2$, $(Me_5Cp)_2MMe_2$, $(Me_5Cp)_2MMeCl$, $(Cp)(Me_5Cp)MCl_2$, $(1\text{-}MeFlu)_2MCl_2$, $(BuCp)_2MCl_2$, $(Me_3Cp)_2MCl_2$, $(Me_4Cp)_2MCl_2$, $(Me_5Cp)_2M(OMe)_2$, $(Me_5Cp)_2M(OH)Cl$, $(Me_5Cp)_2M(OH)_2$, $(Me_5Cp)_2M(C_6H_5)_2$, $(Me_5Cp)_2M(CH_3)Cl$, $(EtMe_4Cp)_2MCl_2$, $[(C_6H_5)Me_4Cp]_2MCl_2$, $(Et_5Cp)_2MCl_2$, $(Me_5Cp)_2M(C_6H_5)Cl$, $(Ind)_2MCl_2$, $(Ind)_2MMe_2$, $(H_4Ind)_2MCl_2$, $(H_4Ind)_2MMe_2$, $\{[Si(CH_3)_3]Cp\}_2MCl_2$, $\{[Si(CH_3)_3]_2Cp\}_2MCl_2$, $(Me_4Cp)(Me_5Cp)MCl_2$.

Representative compounds of formula (III) comprise: $C_2H_4(Ind)_2MCl_2$, $C_2H_4(Ind)_2MMe_2$, $C_2H_4(H_4Ind)_2MCl_2$, $C_2H_4(H_4Ind)_2MMe_2$, $Me_2Si(Me_4Cp)_2MCl_2$, $Me_2Si(Me_4Cp)_2MMe_2$, $Me_2SiCp_2MCl_2$, $Me_2SiCp_2MMe_2$, $Me_2Si(Me_4Cp)_2MMeOMe$, $Me_2Si(Flu)_2MCl_2$, $Me_2Si(2\text{-}Et\text{-}5\text{-}iPrCp)_2MCl_2$, $Me_2Si(H_4Ind)_2MCl_2$, $Me_2Si(H_4Flu)_2MCl_2$, $Me_2SiCH_2(Ind)_2MCl_2$, $Me_2Si(2\text{-}Me\text{-}H_4Ind)_2MCl_2$, $Me_2Si(2\text{-}MeInd)_2MCl_2$, $Me_2Si(2\text{-}Et\text{-}5\text{-}iPr\text{-}Cp)_2MCl_2$, $Me_2Si(2\text{-}Me\text{-}5\text{-}EtCp)_2MCl_2$, $Me_2Si(2\text{-}Me\text{-}5\text{-}Me\text{-}Cp)_2MCl_2$, $Me_2Si(2\text{-}Me\text{-}4,5\text{-}benzoindenyl)_2MCl_2$, $Me_2Si(4,5\text{-}benzoindenyl)_2MCl_2$, $Me_2Si(2\text{-}EtInd)_2MCl_2$, $Me_2Si(2\text{-}iPr\text{-}Ind)_2MCl_2$, $Me_2Si(2\text{-}t\text{-}butyl\text{-}Ind)MCl_2$, $Me_2Si(3\text{-}t\text{-}butyl\text{-}5\text{-}MeCp)_2MCl_2$, $Me_2Si(3\text{-}t\text{-}butyl\text{-}5\text{-}MeCp)_2MMe_2$, $Me_2Si(2\text{-}MeInd)_2MCl_2$, $C_2H_4(2\text{-}Me\text{-}4,5\text{-}benzoindenyl)_2MCl_2$, $Me_2C(Flu)CpMCl_2$, $Ph_2Si(Ind)_2MCl_2$, $Ph(Me)Si(Ind)_2MCl_2$, $C_2H_4(H_4Ind)M(NMe_2)OMe$, isopropylidene-(3-t-butyl-Cp)(Flu)$MCl_2$, $Me_2C(Me_4Cp)(MeCp)MCl_2$, $MeSi(Ind)_2MCl_2$, $Me_2Si(Ind)_2MMe_2$, $Me_2Si(Me_4Cp)_2MCl(OEt)$, $C_2H_4(Ind)_2M(NMe_2)_2$, $C_2H_4(Me_4Cp)_2MCl_2$, $C_2Me_4(Ind)_2MCl_2$, $Me_2Si(3\text{-}Me\text{-}Ind)_2MCl_2$, $C_2H_4(2\text{-}Me\text{-}Ind)_2MCl_2$, $C_2H_4(3\text{-}Me\text{-}Ind)_2MCl_2$, $C_2H_4(4,7\text{-}Me_2\text{-}Ind)_2MCl_2$, $C_2H_4(5,6\text{-}Me_2\text{-}Ind)_2MCl_2$, $C_2H_4(2,4,7\text{-}Me_3Ind)_2MCl_2$, $C_2H_4(3,4,7\text{-}Me_3Ind)_2MCl_2$, $C_2H_4(2\text{-}Me\text{-}H_4Ind)_2MCl_2$, $C_2H_4(4,7\text{-}Me_2\text{-}H_4Ind)_2MCl_2$, $C_2H_4(2,4,7\text{-}Me_3\text{-}H_4Ind)_2MCl_2$, $Me_2Si(4,7\text{-}Me_2\text{-}Ind)_2MCl_2$, $Me_2Si(5,6\text{-}Me_2\text{-}Ind)_2MCl_2$, $Me_2Si(2,4,7\text{-}Me_3\text{-}H_4Ind)_2MCl_2$.

In the simplified formulae given above the symbols have the following meanings: Me=methyl, Et=ethyl, iPr=isopropyl, Bu=butyl, Ph=phenyl, Cp=cyclopentadienyl, Ind=indenyl, $H_4$Ind=4,5,6,7-tetrahydroindenyl, Flu=fluorenyl, Benz=benzyl, M=Ti, Zr or Hf, preferably Zr.

Compounds of the type $Me_2Si(2\text{-}Me\text{-}Ind)_2ZrCl_2$ and $Me_2Si(2\text{-}Me\text{-}H_4Ind)ZrCl_2$ and their methods of preparation are described respectively in European Applications EP-A-485822 and 485820, the description of which is included herein for reference.

Compounds of the type $Me_2Si(3\text{-}t\text{-}butyl\text{-}5\text{-}MeCp)_2ZrCl_2$ and of the type $Me_2Si(2\text{-}Me\text{-}4,5\text{-}benzoindenyl)ZrCl_2$ and their method of preparation are described respectively in Patent U.S. Pat. No. 5,132,262 and in Patent Application EP-A-549900, the description of which is included herein for reference.

The first stage of polymerization (A) can be carried out in liquid phase or in gas phase, working in one or more reactors. The liquid phase can consist of an inert hydrocarbon solvent (suspension process) or of one or more olefins $CH_2=CHR$ (liquid monomer process). Gas-phase polymerization can be carried out using the known fluidized-bed technique or working in conditions in which the bed is mechanically stirred.

The treatment stage (B) is carried out advantageously in two parts, (a) first bringing into contact the polymer produced in polymerization stage (A) with compounds that are able to deactivate the catalyst used in said stage (A), and then (b), bringing into contact the product obtained in (a) with solutions of the transition metal M in hydrocarbon solvents (benzene, toluene, heptane, hexane, liquid propane and the like).

Examples of compounds that can be used in treatment stage (a) can be selected from the group consisting of compounds having the general formula $R_{y-1}XH$ in which R is hydrogen or a hydrocarbon group with from 1 to 10 carbon atoms, X is O, N, or S, and y is the valency of X.

Non-limitative examples of such compounds are represented by alcohols, thioalcohols, mono- and di-alkylamines, $NH_3$, $H_2O$ and $H_2S$. Preferred compounds are those in which X is O and among these, a particularly preferred compound is water.

Other examples of compounds that can be used in treatment stage (a) are CO, COS, $CS_2$, $CO_2$, $O_2$ and acetylenic or allenic compounds.

The molar ratio between the deactivating compound and the compound of the transition metal $M'$ should preferably be such as to ensure substantial deactivation of the catalyst of stage (A). The value of this ratio is preferably greater than 50, more preferably greater than 150 and in particular greater than 250.

Treatment (a), in which these deactivating compounds are brought into contact with the polymer produced in stage (A), can be effected in various ways. In one of these, the polymer is brought into contact, for a time ranging from 1 minute to some hours, with a hydrocarbon solvent that contains the deactivating compound in solution, suspension or dispersion. An example of dispersion of the deactivating compound in a hydrocarbon solvent is represented by humidified hexane. At the end of treatment (a) the liquid is removed and the polymer undergoes treatment (b).

Treatment (b) is preferably carried out using the compound of the transition metal M in solutions of hydrocarbon solvents containing a dissolved alkyl-Al compound, such as triisobutyl-Al, triethyl-Al and/or an aluminoxane, for example polymethylaluminoxane (MAO), tetraisobutylaluminoxane or tetra(2,5-dimethylhexyl)-aluminoxane. The molar ratio of the alkyl-Al compound to the compound of the transition metal M is greater than 2 and is preferably between 5 and 1000. The said treatment (b) can be carried out by suspending the polymer obtained from stage (a) in hydrocarbon solvents containing the dissolved compound of transition metal M, and optionally an alkyl-Al compound and/or an aluminoxane, generally working at temperature between 0 and 100° C., preferably between 10 and 60° C., and removing the solvent at the end of the treatment. Alternatively, the polymer obtained from (a) can be brought into contact, dry, with solutions of the compound of the transition metal M containing the minimum quantity of solvent for keeping the said compound in solution. Stage (B) can be conveniently carried out in the gas phase in a loop reactor, in which the polymer produced in the first stage of polymerization is circulated by a stream of inert gas. Solutions of the deactivating compound and of the compound of the transition metal M are fed successively, for example using a sprayer, to the loop reactor in the gas phase, and a free-flowing product is obtained at the end of the treatment. Conveniently, before stage (b), the product is treated with compounds that are able to decontaminate the system, for example with alkyl-Al compounds.

The quantity of compound of the transition metal M, expressed as metal, contained in the product obtained from stage (B), can vary over a wide range depending on the compound of transition metal M used and on the relative quantity of product that it is desired to produce in the various stages. Generally this quantity is between $1 \cdot 10^{-7}$ and $5 \cdot 10^{-3}$ g of metal M/g of product, preferably between $5 \cdot 10^{-7}$ and $5 \cdot 10^{-4}$, more preferably between $1 \cdot 10^{-6}$ and $1 \cdot 10^{-4}$.

The second stage of polymerization (C) can be carried out in liquid phase or in gas phase, working in one or more reactors. The liquid phase can consist of an inert hydrocarbon solvent (suspension process) or of one or more olefins $CH_2=CHR$ (liquid monomer process). Gas-phase polymerization can be carried out in reactors with a fluidized bed or with a mechanically-stirred bed. During said stage (C), it is convenient to feed, to the polymerization reactor, an alkyl-Al compound selected from Al-trialkyls in which the alkyl groups have 1–12 carbon atoms, and linear or cyclic aluminoxane compounds containing the repeat unit —$(R_4)AlO$— in which $R_4$ is an alkyl group with 1–12 carbon atoms or a cycloalkyl or aryl group with 6–10 carbon atoms, the said aluminoxane compounds containing from 1 to 50 repeat units. As a rule the alkyl-Al compound is fed to polymerization stage (C) when treatment (b) in stage (B) is carried out in the absence of alkyl-Al compounds.

The advantages of the process according to the present invention are found both in the quality of the final product and in the flexibility of the process. Treatment stage (B) in fact makes it possible to work with different catalytic systems in polymerization stages (A) and (C).

In particular, in the absence of treatment (a), it would be necessary to produce to high amounts of polymer in stage (A) so as to exhaust the activity of the catalyst itself in this stage. However, this would involve production of too large quantities of product that comes from the said stage. This would result either in the production of a final product in which the portion that derives from stage (A) of the process would largely predominate, or alternatively production of a final product with fractions that come from stages (A) and (C) that are balanced, but with unsuitable dimensions of the polymer particles.

The process of the invention can be used for preparing a wide range of olefin polymer compositions. In particular, the process of the invention is particularly suitable for the production of high-impact polypropylene (heterophase copolymers of propylene). In such a case it is possible to obtain elastomeric copolymers in which there are no relatively long sequences of the same monomer unit and, therefore, to obtain copolymers with valuable elastomeric properties.

In fact, a further aspect of the present invention is a process for the preparation of heterophase copolymers of propylene, characterized in that it comprises:
(A) a first stage of polymerization in which, in one or more reactors, propylene and possibly ethylene and/or one or more olefins $CH_2=CHR''$, where $R''$ is a hydrocarbon radical with 2–10 carbon atoms, are polymerized in the presence of a catalyst comprising the product of the reaction between an alkyl-Al compound, optionally an electron-donor compound (external donor) and a solid component comprising at least one compound of a transition metal $M^I$ selected from titanium and vanadium and not containing $M^I$-$\pi$ bonds, a magnesium halide in active form and optionally an electron-donor compound (internal donor), obtaining an olefin polymer that has porosity, expressed as percentage of voids, greater than 10%, content of units derived from ethylene and/or from the $CH_2=CHR''$ olefin less than 20% by weight, content of units derived from propylene greater than 80% by weight and insolubility in xylene greater than 60%;
(B) a treatment stage in which the product obtained in said stage (A) is, in any order whatever:
  (a) brought into contact with a compound that is capable of deactivating the catalyst present in stage (A);
and,
  (b) brought into contact with a compound of a transition metal M selected from Ti, V, Zr and Hf containing at least one M-$\pi$ bond and optionally with an alkyl-Al compound;
(C) a second stage of polymerization in which, in one or more reactors, one or more olefins $CH_2=CHR$, where R is hydrogen or an alkyl, cycloalkyl or aryl radical with 1–10 carbon atoms, are polymerized in the presence of the product obtained in stage (B), obtaining a substantially amorphous olefin (co) polymer in quantity between 20 and 80% by weight based on the total amount of polymer produced in stages (A) and (C).

The polymer produced in said first stage of polymerization (A) is preferably a homopolymer of propylene with high isotacticity index, or a crystalline copolymer of propylene that has a content by weight of units derived from ethylene and/or from the $CH_2=CHR''$ olefin below 10%.

Non-limitative examples of substantially amorphous olefin (co)polymers that can be prepared in stage (C) are the elastomeric copolymers of ethylene and propylene and the elastomeric terpolymers of ethylene and propylene with smaller proportions of a diene, which have a content by weight of units derived from ethylene between about 30 and 70%; the elastomeric copolymers of ethylene and butene and the elastomeric terpolymers of ethylene, butene and propylene having a content by weight of units derived from ethylene between about 30 and 70%; the atactic polypropylenes with high molecular weight ($\eta$>1). Examples of these copolymers are described in European Patent Applications EP-A-586658, EP-A-604917 and in Italian Patent Applications MI-93A000943, MI-93A001405, MI-93A001406, MI-93A001960 and MI-93A001963, to which reference is made for the part relating to the characteristics of the products and to the catalysts used in their production.

Polymerization stage (A) can be conveniently carried out in liquid propylene, working in one or more loop reactors, or in the gas phase, working in one or more reactors with fluidized bed or mechanically stirred bed. The gas-phase technology with a fluidized-bed is preferred.

Polymerization stage (C) is preferably carried out in one or more reactor in the gas-phase, with a fluidized-bed. Other technologies (for example suspension polymerization or gas-phase polymerization with mechanically stirred bed) can be used.

The porosity (expressed as percentage of voids) of the polymer produced in the first stage of polymerization (A) is preferably greater than 15% and more preferably greater than 20%. The distribution of pore radius is such that more than 40% of the porosity is due to pores with diameter greater than 10000 Å. Preferably, and for high values of porosity, more than 90% of the porosity is due to pores with diameter greater than 10000 Å.

The amount of polymer produced in polymerization stage (C) is preferably between 25% and 75%, more preferably between 35% and 65% by weight based on the total amount of polymer produced in stages (A) and (C).

The process is preferably carried out continuously, working in both stages of polymerization (A) and (C) in gas-phase fluidized-bed reactors and effecting stage (B) in a gas-phase loop reactor. Polymerization stage (A) is preferably preceded by a stage of prepolymerization in which propylene or its mixtures with ethylene and/or $CH_2=CHR''$ olefins are polymerized in the presence of the catalyst described in (A) in a quantity of between 5 and 500 g/g catalyst.

The following examples are given to better illustrate the invention but do not limit it.

The properties indicated are determined with the following methods:

Porosity and surface with nitrogen: are determined according to B.E.T. methodology (equipment used: SORPTOMATIC 1800 from Carlo Erba).

Size of catalyst particles: is determined by a method based on the principle of optical diffraction of monochromatic laser light with the "Malvern Instr. 2600" apparatus. The mean size is stated as P50.

Melt Index E (MIE): determined according to ASTM-D 1238, method E.

Melt Index F (MIF): determined according to ASTM-D 1238, method F.

Ratio of degrees (F/E): ratio of Melt Index F to Melt Index E.

Melt Index L (MIL): determined according to ASTM-D 1238, method L.

Flowability: is the time taken for 100 g of polymer to flow through a funnel whose discharge hole has a diameter of 1.25 cm and whose walls are inclined at 20° to the vertical.

Density: DIN 53194.

Morphology and particle size distribution of the polymer particles: ASTM-D 1921-63.

Fraction soluble in xylene: measured by dissolving the polymer in boiling xylene and determining the insoluble residue after cooling to 25° C.

Content of comonomer: percentage by weight of comonomer determined by IR spectroscopy.

Effective density: ASTM-D 792.

Porosity: the porosity expressed as percentage of voids is determined by absorption of mercury under pressure. The volume of mercury absorbed corresponds to the volume of the pores. For this determination, a calibrated dilatometer (diameter 3 mm) CD3 (Carlo Erba) connected to a reservoir of mercury and to a high-vacuum pump ($1 \cdot 10^{-2}$ mba) is used. A weighed amount of sample (about 0.5 g) is placed in the dilatometer. The apparatus is then placed under high vacuum (<0.1 mm Hg) and is kept in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the apparatus is pressurized with nitrogen (2.5 kg/cm$^2$). Under the effect of the pressure, the mercury penetrates into the pores and the level goes down according to the porosity of the material. Once the level at which the mercury has stabilized has been measured on the dilatometer, the volume of the pores is calculated from the equation $V=R^2 \cdot \pi \cdot \Delta H$, where R is the radius of the dilatometer and $\Delta H$ is the difference in cm between the initial and final level of the mercury in the dilatometer. By weighing the dilatometer, dilatometer+mercury, dilatometer+mercury+sample, the value of the apparent volume $V_1$ of the sample prior to penetration of the pores can be calculated. The volume of the sample is given by:

$$V_1 = [P_1 - (P_2 - P)]/D$$

where P is the weight of the sample in grams, $P_1$ is the weight of the dilatometer+mercury in grams, $P_2$ is the weight of the dilatometer+mercury+sample in grams, D is the density of mercury (at 25° C.=13.546 g/cm$^3$). The percentage porosity is given by the relation $X=(100 \cdot V)/V_1$.

Intrinsic viscosity (IV: determined in tetrahydronaphthalene at 135° C.

EXAMPLES

Example 1

Comparative

Stage (A): Preparation of PP Homopolymer

In a 50 ml glass flask, 0.0161 g of a solid catalytic component, prepared according to Example 3 of U.S. Pat. No. 5,221,651, was pre-contacted with 0.799 g of triethylaluminium (TEAL) and 0.31 g of cyclohexylmethyldimethoxysilane (CMMS) in 8 ml of anhydrous hexane. The mixture was introduced into a 4.25-liter steel autoclave which was previously purged with successive washings first with hexane at 80° C. for one hour and then with gaseous propylene at 80° C. for one hour. Next, 1752 g of liquid propylene were introduced together with 982 ml of hydrogen at 30° C. The temperature was raised to 70° C. and polymerization was carried out for 180 minutes, obtaining 248 g of polypropylene with the following characteristics: IV=1.55 dl/g; xylene-insoluble matter=96% by weight.

Stage (C): Copolymerization of Ethylene and Propylene

After removing the propylene, the same reactor was charged with 500 g of liquid propane at a temperature of 50° C. and a pressure of 19.5 bar. Then 7 mmol of M-MAO, dissolved in ISOPAR C, were introduced, and the mixture was left in contact with the polymer for 10 minutes at 50° C. The propane was removed by evaporation at 50° C. and some washings with gaseous propylene were effected at 50° C. to eliminate the residual propane. 19.3 g of ethylene and 41.6 g of propylene were added to the polymer thus obtained, in the same reactor at 50° C. Polymerization was carried out by introducing a mixture of the two monomers containing 60% by weight of ethylene. Copolymerization was carried out at 50° C. and at 9 bar for 120 minutes. 276 g of copolymer, having the characteristics shown in Table 1, were obtained.

Example 2

Comparative

Stage (A): Preparation of PP Homopolymer

The catalyst and the propylene homopolymer were prepared as described in Stage A of Example 1. Polymerization was carried out using 0.0132 g of solid catalytic component. 209 g of homopolymer with the following characteristics were obtained: IV=1.57 dl/g; insoluble in xylene=96.1% by weight.

Stage (B): Treatment (b) With EBTHI-ZrCl$_2$

After eliminating the propylene 1, the same reactor was charged with 500 g of liquid propane at a temperature of 50° C. and a pressure of 19.5 bar. Then 0.005 g of EBTHI-ZrCl$_2$ precontacted in ISOPAR C with 11.7 mmol of M-MAO at 25° C. for 10 minutes were introduced. The mixture was left in contact with the polymer for 10 minutes at 50° C. The propane was removed by evaporation at 50° C. and some washings were effected with gaseous propylene at 50° C. to eliminate the residual propane.

Stage (C): Copolymerization of Ethylene and Propylene

The procedure described in Stage (C) of Example 1 was followed, carrying out copolymerization for 240 minutes and obtaining 381 g of copolymer with the characteristics shown in Table 1.

Example 3

Stage (A): Preparation of PP Homopolymer

The catalyst and the propylene homopolymer were prepared as described in Stage (A) of Example 1. Polymerization was carried out using 0.0146 g of solid catalytic component, obtaining 186 g of homopolymer that has the following characteristics: IV=1.55 dl/g; insoluble in xylene= 95.9% by weight.

Stage (B): Treatment (a) With H$_2$O and Treatment (b) With EBTHI-ZrCl$_2$

After degassing the propylene, the same reactor was charged with 1000 ml of hexane humidified with 0.0513 g of H$_2$O. It was left in contact with the polymer at 50° C. for 30 minutes, in a nitrogen atmosphere. The liquid was eliminated by siphoning and some washings were carried out at room temperature with cycles of vacuum/nitrogen. The same reactor was charged with 500 g of liquid propane at a temperature of 50° C. and pressure of 19.5 bar. Then 0.005 g of EBTHI-ZrCl$_2$, precontacted in ISOPAR C with 11.7 mmol of M-MAO at 25° C. for 10 minutes, were introduced. The polymer was left in contact with this mixture for 10 minutes at 50° C. The propane was removed by evaporation at 50° C. and some washings were effected with gaseous propylene at 50° C. to eliminate the residual propane.

Stage (C): Copolymerization of Ethylene and Propylene

The procedure described in Stage (C) of Example 1 was followed, copolymerizing for 50 minutes and obtaining 256 g of copolymer having the characteristics shown in Table 1.

Example 4

Comparative

Stage (A): Preparation of PP Homopolymer

In a 50 ml glass flask, 0.0187 g of a solid catalytic component, prepared according to Example 3 of U.S. Pat. No. 5,221,651, were pre-contacted with 1.48 g of triisobutylaluminium (TIBAL) and 0.0706 g of cyclohexylmethyldimethoxysilane (CMMS) in 8 ml of anhydrous hexane. The mixture was placed in a 4.25-liter steel autoclave which was previously purged with successive washings first with hexane at 80° C. for one hour and then with gaseous propylene at 80° C. for one hour. Then 1286 g of liquid propylene were introduced at 30° C. The temperature was raised to 70° C. and polymerization was carried out for 120 minutes, obtaining 32 g of homopolymer having the following characteristics: IV=5.68 dl/g; insoluble in xylene=89.7% by weight.

Stage (C): Copolymerization of Ethylene and Propylene

After degassing the propylene, the same reactor was charged with 500 g of liquid propane at a temperature of 50° C. and pressure of 19.5 bar. Then 9.38 mmol of TIBAO, dissolved in cyclohexane, were introduced, and the mixture was left in contact with the polymer for 10 minutes at 50° C. The propane was removed by evaporation at 50° C. and some washings were effected with gaseous propylene at 50° C. to eliminate the residual propane. 33.8 g of ethylene and 72.9 g of propylene were added to the product thus obtained, in the same reactor at 50° C. The composition of the copolymer was kept constant by feeding a mixture of the two monomers containing 60% by weight of ethylene. Copolymerization was carried out at 50° C. and at 15 bar for 245 minutes. 315 g of copolymer with the characteristics shown in Table 2 were obtained.

Example 5

Comparative

Stage (A): Preparation of PP Homopolymer

The catalyst and the propylene homopolymer were prepared as described in Stage (A) of Example 4. Polymerization was carried out using 0.02 g of solid catalytic component, obtaining 69 g of homopolymer having the following characteristics: IV=4.69 dl/g; insoluble in xylene= 82% by weight.

Stage (B): Treatment (b) With EBTHI-ZrCl$_2$

After degassing the propylene, the same reactor was charged with 500 g of liquid propane at a temperature of 50° C. and pressure of 19.5 bar. Then 0.004 g of EBTHI-ZrCl$_2$, precontacted in cyclohexane with 9.38 mmol of TIBAO at 25° C. for 10 minutes, were introduced. The mixture was left in contact with the polymer for 10 minutes at 50° C. The propane was removed by evaporation at 50° C. and some washings were effected with gaseous propylene at 50° C. to eliminate the residual propane.

Stage (C): Copolymerization of Ethylene and Propylene

The procedure described in Stage (C) of Example 1 was followed, copolymerizing for 54 minutes and obtaining 353 g of copolymer having the characteristics shown in Table 2.

Example 6

Stage (A): Preparation of PP Homopolymer

The catalyst and the propylene homopolymer were prepared as described in Stage (A) of Example 4. Polymerization was carried out using 0.0414 g of solid catalytic component, obtaining 170 g of homopolymer having the following characteristics: IV=4.4 dl/g; insoluble in xylene= 85.3% by weight.

Stage (B): Treatment (a) With H$_2$O and Treatment (b) With EBTHI-ZrCl$_2$

After degassing the propylene, the same reactor was charged with 1000 ml of hexane humidified with 0.068 g of H$_2$O. It was left in contact with the polymer at 50° C. for 30 minutes, in a nitrogen atmosphere. The liquid was removed by siphoning and some washings were carried out at room temperature with cycles of vacuum/nitrogen. Then the same reactor was loaded with 1.48 g of TIBAL dissolved in 500 g of liquid propane at a temperature of 50° C. and pressure of 19.5 bar. The polymer was left in contact with this mixture for 20 minutes at 50° C. Then 0.020 g of EBTHI-ZrCl$_2$, pre-contacted in cyclohexane with 46.9 mmol of TIBAO at 25° C. for 10 minutes, were introduced. The polymer was left in contact with this mixture for 10 minutes at 50° C. The propane was removed by evaporation at 50° C. and some washings were carried out with gaseous propylene at 50° C. to eliminate the residual propane.

Stage (C): Copolymerization of Ethylene and Propylene

The procedure described in Stage (C) of Example 1 was followed, carrying out the copolymerization for 81 minutes and obtaining 260 g of copolymer having the characteristics shown in Table 2.

TABLE 1

Characteristics of the copolymers of Examples 1–3

|  |  | Example |  |  |
|---|---|---|---|---|
|  |  | 1 | 2 | 3 |
| Ethylene-Propylene Copolymer | % by weight | 21.4 | 53.8 | 40.2 |
| M.p. DSC* | ° C. | 118 | 116 | — |
| M.p. DSC* | ° C. | 167 | 164 | 166 |
| Xylene-sol. | % by weight | 12.9 | 43.9 | 42 |
| Xylene-insol. | % by weight | 87.1 | 56.1 | 58 |
| IV homopolym. | dl/g | 1.55 | 1.57 | 1.55 |
| IV final | dl/g | 2.77 | 2.71 | 1.24 |

TABLE 2

Characteristics of the copolymers of Examples 4–6

|  |  | Example No. |  |  |
|---|---|---|---|---|
|  |  | 4 | 5 | 6 |
| Ethylene-Propylene Copolymer | % by weight | 90 | 82 | 35 |
| M.p. DSC* | ° C. | 116 | 113 | — |
| M.p. DSC* | ° C. | 158 | 156 | 159 |
| Xylene-sol. | % by weight | 53.2 | 58.4 | 41.1 |
| Xylene-insol. | % by weight | 44.7 | 39.8 | 57.9 |
| IV homopolym. | dl/g | 5.68 | 4.69 | 4.4 |
| IV final | dl/g | 8.81 | 6.35 | 2.96 |

*The region of the thermogram between 100–180° C. is examined, in which the melting-point peaks of PP homopolymer and of the semi-crystalline fraction of the rubber, if produced, can appear.

We claim:

1. Homopolymers or copolymers obtained by a multistage continuous process for the polymerization of one or more olefins having the formula $CH_2=CHR$, in which R is hydrogen or R has from 1 to 10 carbon atoms and is an alkyl, cycloalkyl or aryl group, the process comprising:

(A) a first stage of polymerization in which one or more of the olefins are polymerized, in one or more reactors, in the presence of a catalyst comprising the product of reaction between an alkyl-Al compound and a solid component in the form of spheroidal particles with a mean diameter of between 10 and 150 μm, comprising a compound of a transition metal $M^I$ selected from the group consisting of Ti and V, not containing M-π bonds, and a halide of Mg in active form, to produce an olefin homo or copolymer, (B) a treatment stage in which the product obtained in the first stage of polymerization (A) is:

(a) brought into contact with a compound capable of deactivating the catalyst present in the stage (A); and thereafter (b) brought into contact with a compound of a transition metal M selected from the group consisting of Ti, Zr, V, or Hf containing at least one M-π bond and optionally with an alkyl-Al compound;

(C) a second stage of polymerization in which one or more of the olefins are polymerized, in one or more reactors, in the presence of the product obtained in treatment stage (B);

and wherein the amount of olefin homo- or copolymer produced in the first stage polymerization (A) and treated in treatment stage (B) is between 10% and 90% by weight of the total amount of polymer produced in stages (A) and (C) combined.

2. Homopolymers and copolymers obtained in a multistage continuous process for the preparation of heterophase copolymers of propylene, the process comprising:

(A) a first stage of polymerization in which, in one or more reactors, propylene and optionally ethylene and/or one or more olefins $CH_2=CHR''$, where $R''$ is a hydrocarbon radical with 2–10 carbon atoms, are polymerized in the presence of a catalyst comprising the product of the reaction between an alkyl-Al compound, optionally an electron-donor compound (external donor) and a solid component in the form of spheroidal particles with a mean diameter of between 10 and 150 μm, comprising at least one compound of a transition metal $M^I$ selected from titanium and vanadium and not containing $M^I$-π bonds, a magnesium halide in active form and optionally an electron-donor compound (internal donor), obtaining an olefin polymer having porosity, expressed as percentage of voids, greater than 10%, content of units derived from ethylene and/or from the $CH_2=CHR''$ olefin less than 20% by weight, content of units derived from propylene greater than 80% by weight and insolubility in xylene greater than 60%;

(B) a treatment stage in which the product obtained in stage (A) is:

(a) brought into contact with a compound that is capable of deactivating the catalyst present in stage (A); and thereafter (b) brought into contact with a compound of a transition metal M selected from Ti, V, Zr and Hf containing at least one M-π bond and optionally with an alkyl-Al compound;

(C) a second stage of polymerization in which, in one or more reactors, one or more olefins $CH_2=CHR$, where R is hydrogen or R has from 1 to 10 carbon atoms and is an alkyl, cycloalkyl or aryl radical, are polymerized in the presence of the product obtained in stage (B), obtaining a substantially amorphous olefin (co)polymer in a quantity of between 20 and 80% by weight based on the total amount of polymer produced in stages (A) and (C).

3. Homopolymers and copolymers obtained in a multistage continuous process for the polymerization of one or more olefins having the formula $CH_2=CHR$, in which R is hydrogen or R has from 1 to 10 carbon atoms and is an alkyl, cycloalkyl, or aryl group, the process comprising:

(A) a first stage of polymerization in which one or more of the olefins are polymerized, in one or more reactors, in the presence of a catalyst comprising the product of the reaction between an alkyl-Al compound and a solid component in the form of spheroidal particles with a mean diameter of between 10 and 150 μm, comprising a compound of a transition metal $M^I$ selected from titanium and vanadium and not containing $M^I$-π bonds, and a halide of Mg in active form, to produce an olefin homo- or copolymer;

(B) a treatment stage in which the product obtained in stage (A) is, in any order whatever:

(a) brought into contact with water;
(b) brought into contact with a compound of a transition metal M selected from Ti, V, Zr and Hf containing at least one M-$\pi$ bond and optionally with an alkyl-Al compound;
(C) a second stage of polymerization in which one or more of the olefins are polymerized, in one or more reactors, in the presence of the product obtained in stage (B);

and wherein the amount of olefin homo- or copolymer produced in the first stage polymerization (A) and treated in treatment stage (B) is between 10% and 90% by weight of the total amount of polymer produced in stages (A) and (C) combined.

* * * * *